(12) United States Patent
Furquim et al.

(10) Patent No.: US 8,381,606 B2
(45) Date of Patent: Feb. 26, 2013

(54) TRANSMISSION WITH REVERSE IDLER GEAR SYNCHRONIZATION SYSTEM

(75) Inventors: Ricardo Furquim, Santo Andre (BR); Arnaldo Silva, Indaiatuba (BR); Edgard L. A. Souza, Jr., Hofheim Am (BR)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 13/160,177

(22) Filed: Jun. 14, 2011

(65) Prior Publication Data

US 2012/0318084 A1 Dec. 20, 2012

(51) Int. Cl.
*F16H 3/08* (2006.01)
(52) U.S. Cl. .................. 74/331; 74/340; 74/473.36
(58) Field of Classification Search .............. 74/331, 74/333, 340, 473.36, 473.37
See application file for complete search history.

(56) References Cited

U.S. PATENT DOCUMENTS

| | | | | |
|---|---|---|---|---|
| 3,364,768 A * | 1/1968 | Powell | ........................ | 74/339 |
| 3,478,615 A * | 11/1969 | Hanchett | ...................... | 74/339 |
| 4,160,456 A * | 7/1979 | Hawkins et al. | .............. | 460/116 |
| 4,677,868 A * | 7/1987 | Filkins | ........................ | 74/359 |
| 5,447,082 A * | 9/1995 | Stine et al. | ................... | 74/331 |
| 6,122,983 A * | 9/2000 | Hoffman | ..................... | 74/337.5 |

* cited by examiner

*Primary Examiner* — Ha D. Ho

(57) ABSTRACT

A multi-speed transmission is disclosed having an input and output shafts supported by a housing, two gear sets each having a drive gear and a driven gear, and at least two shift forks coupled with synchronizers. An idler gear is selectively manipulated by a reverse lever to intermesh with a drive gear and a driven gear of one of the gear sets to create a reverse gear ratio. The reverse lever includes a cam portion that is selectively engageable with one of the shift forks. When the reverse lever is manipulated to move the idler gear to intermesh with the reverse gear set, the cam portion of the reverse lever triggers partial engagement of another gear set in order to synchronize the speed between the input and output shaft so that the idler gear is spinning at a similar speed as the driven gear of the reverse gear set.

16 Claims, 5 Drawing Sheets

TRANSMISSION WITH REVERSE IDLER GEAR SYNCHRONIZATION SYSTEM

FIELD

The present disclosure relates generally to transmissions and more specifically to manual transmissions having an idler gear brake employed to reduce gear clash when shifting into a reverse gear ratio.

BACKGROUND

The statements in this section merely provide background information related to the present disclosure and may or may not constitute prior art.

A typical manual transmission includes a plurality of shafts, gears, shift mechanisms, synchronizers or other torque-transmitting mechanisms that cooperate to provide a plurality of forward and reverse gear or speed ratios. The transmission input shaft is selectively connected to an engine output shaft and includes a number of gears that are selectively connectable to the input shaft using, for example, synchronizers. The gears of the input shaft mesh with corresponding gears that are selectively connectable to an output shaft. To achieve a particular forward gear ratio between the transmission input and output shafts, the driver operates a shift mechanism, such as a manual shifter, that controls the engagement of the synchronizers with the desired gears. To achieve a reverse gear ratio, an idler gear is used to slide between an input shaft gear and an output shaft gear to reverse the rotational direction of the output shaft, and thus the drive wheels.

The idler gear is free to rotate on an idler gear shaft and the idler gear is not necessarily rotating when the idler gear is engaged to the input shaft reverse gear. However, the input shaft reverse gear is often rotating at a high speed having only recently been disengaged from the engine output shaft. Once the idler gear is meshing with the input shaft reverse gear they will both be rotating at the same high speed. The idler gear must then engage the output shaft gear to complete the torque transfer to the output shaft. However, as often is the case, the output shaft is not rotating and may even be rotating in the opposite direction as the driver may be shifting into reverse before the vehicle has stopped moving forward. The meshing of the fast rotating idler gear with a stationary output gear causes an impact or gear clash that creates noise and grinding that is very objectionable to the driver. Furthermore, gear clash is detrimental to the long term durability of the transmission and is the source of costly customer repair bills.

Accordingly, there is room in the art for a transmission that includes a mechanism to reduce or eliminate gear clash and premature component wear by reducing the input shaft and idler gear rotational speed when the driver is shifting into a reverse gear ratio.

SUMMARY

A multi-speed transmission having a first, a second, and a third shaft supported in parallel by a housing, a first and a second gear set each having a drive gear radially aligned with a driven gear, an idler gear rotatably supported by the third shaft, a first and second shift rails supported by the housing and disposed parallel to the first, second, and third shafts, a first and a second shift fork each having a first and second end portions, a synchronizer rotatably fixed to the first shaft and disposed adjacent the driven gear of the first gear set, a reverse lever having a first end portion, a second end portion, and a cam portion. The drive gears are rotatably fixed to the first shaft, the driven gears are selectively rotatably connectable to the second shaft, and the drive gear of the first gear set meshes with the driven gear of the first gear set. The idler gear is selectively meshed with each of the drive gear and the driven gear of the second gear set. The first end portion of the first shift fork is supported by the first shift rail. The first end portion of the second shift fork is fixed to the second shift rail. The second end portion of the second shift fork is coupled to the idler gear. The synchronizer is coupled to the second portion of the first shift fork and is selectively engageable with the driven gear of the first gear set. The first end portion is fixed to an elongated member having an axis. The reverse lever is rotatable about and movable along the axis of the elongated member. The second end portion is selectively engageable with the second shift rail. The cam portion is selectively engageable with the second portion of the first shift fork. The reverse lever is selectively disposed in one of at least a first, second and third positions. The reverse lever is selectively disposed in one of at least a first, second and third positions. In the first position the reverse lever is fully retracted so that the second end portion is disengaged from the second shift rail. In the second position the reverse lever is axially extended so that the second end portion is fully engaged with the second shift rail. In the third position the reverse lever is fully engaged with the second shift rail and rotated to a first rotational position so that the idler gear is at least partially meshed with the drive gear of the second gear set and the outer surface of the cam portion is in contact with the second portion of the first shift fork which partially engages the synchronizer with the driven gear of the first gear set.

In another example of the present invention, the reverse lever is selectively disposed in a fourth position. In the fourth position the reverse lever is extended in the second direction and fully engaged with the second shift rail and rotated to a second rotational position so that the cam portion of the reverse lever is not in contact with the first shift fork, and the idler gear is fully meshed with each of the drive gear and the driven gear of the second gear set.

In yet another example of the present invention, the reverse lever is selectively disposed in a fifth position. In the fifth position the reverse lever is extended in the second direction and fully engaged with the second shift rail and rotated to a third rotational position, and the inner surface of the cam portion is in contact with the first shift fork.

In yet another example of the present invention, the second end portion of the first shift fork includes a flange supporting a spring pivot assembly. The flange includes a first portion and a second portion. The first portion of the flange is fixed to the first portion of the first shift fork. The second portion of the flange has a first pivot hole.

In yet another example of the present invention, the spring pivot assembly includes a pivot member having a first end portion, a first edge, and a second edge opposite the first edge, a pivot pin disposed in each of the first and second pivot holes, and a spring having a coil portion and two end portions. The pivot member is disposed adjacent to the pivot member of the first shift fork. The second end portion includes a second pivot hole aligned with the first pivot hole of the flange, a pivot dowel fixedly disposed on the second portion of the pivot member so that the axis of the pivot dowel is somewhat perpendicular to the pivot member. The coil portion is disposed on the pivot pin. A first of the two end portion is disposed in contact with the first edge of the pivot member. A second of the two end portions is disposed in contact with the second edge of the pivot member. The spring applies a detent force to the pivot member when the pivot member rotates in either rotational direction about an axis of the pivot pin.

In yet another example of the present invention, the reverse lever is in the third position the outer surface of the cam portion is in contact with the pivot dowel of the spring pivot assembly of the first shift fork which partially engages the synchronizer with the driven gear of the first gear set.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
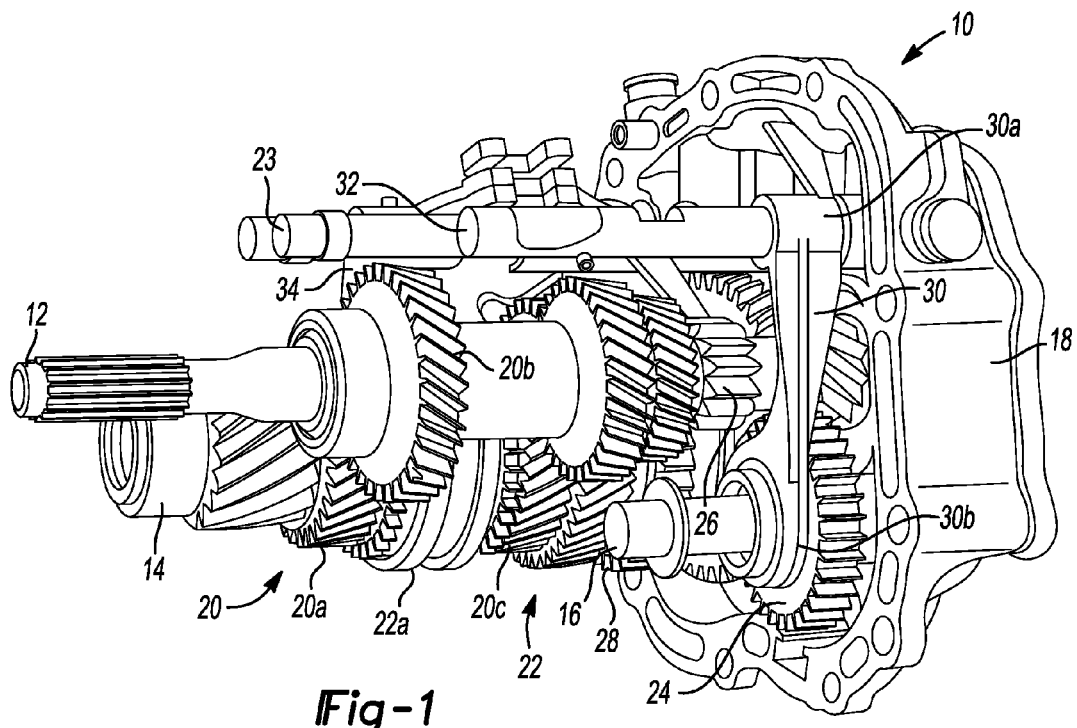
FIG. 1 is a perspective view of a transmission according to the present disclosure.

Referring to the drawings, wherein like reference numbers refer to like components, in FIG. 1 a perspective view of a partial transmission 10 of the present invention is illustrated. The transmission 10 includes an input shaft 12, a main shaft 14, and an idler shaft 16 with each supported by a housing 18. The input shaft 12 is connected to, for example, an engine output shaft (not shown) and the main shaft 14 is connected to, for example, a vehicle drive shaft (not shown) that provides torque to a drive wheel of the vehicle. The transmission 10 further includes a plurality of gearsets 20, a plurality of synchronizers 22, and a plurality of shift rails 23. The input and main shafts 12, 14 rotatably support the plurality of gear sets 20. A plurality of synchronizers 22 (one of which is shown) are supported by the main shaft 14 and are selectively manipulated to achieve a desired forward gear ratio between the input shaft 12 and the main shaft 14. For example, to achieve a forward gear ratio, a synchronizer 22A is engaged to couple a gear 20A from one of the plurality of gear sets 20 to the main shaft 14 in order to transfer torque from the input shaft 12 to the main shaft 14.

The idler shaft 16 is fixed securely with the housing 18 and supports an idler gear 24. The idler gear 24 is capable of selective movement along the idler shaft 16 to intermesh with both of a reverse gear 26 of the input shaft 12 and a sleeve gear or member 28 on the main shaft 14. When a reverse gear ratio is desired, the idler gear 24 meshes independently with the reverse gear 26 that is engaged with the input shaft 12 and the sleeve gear 28 that is selectively engaged with the main shaft 14. When engaged, the idler gear assembly 24 reverses the direction of the sleeve gear 28 of the main shaft 14 and therefore reverses the direction of rotation of the drive shaft (not shown) of the vehicle. For example, the idler gear assembly 24 is coupled to a shift fork linkage 30 that includes a first end 30A secured to a reverse shift rail or member 32 of the plurality of shift rails 23 and a second end 30B that engages and moves the idler gear assembly 24 axially along the idler shaft 16 upon axial movement of the reverse shift rail 32. However, other methods or mechanisms of manipulating the idler gear assembly 24 may be employed without departing from the scope of the present invention.

Figure 2:
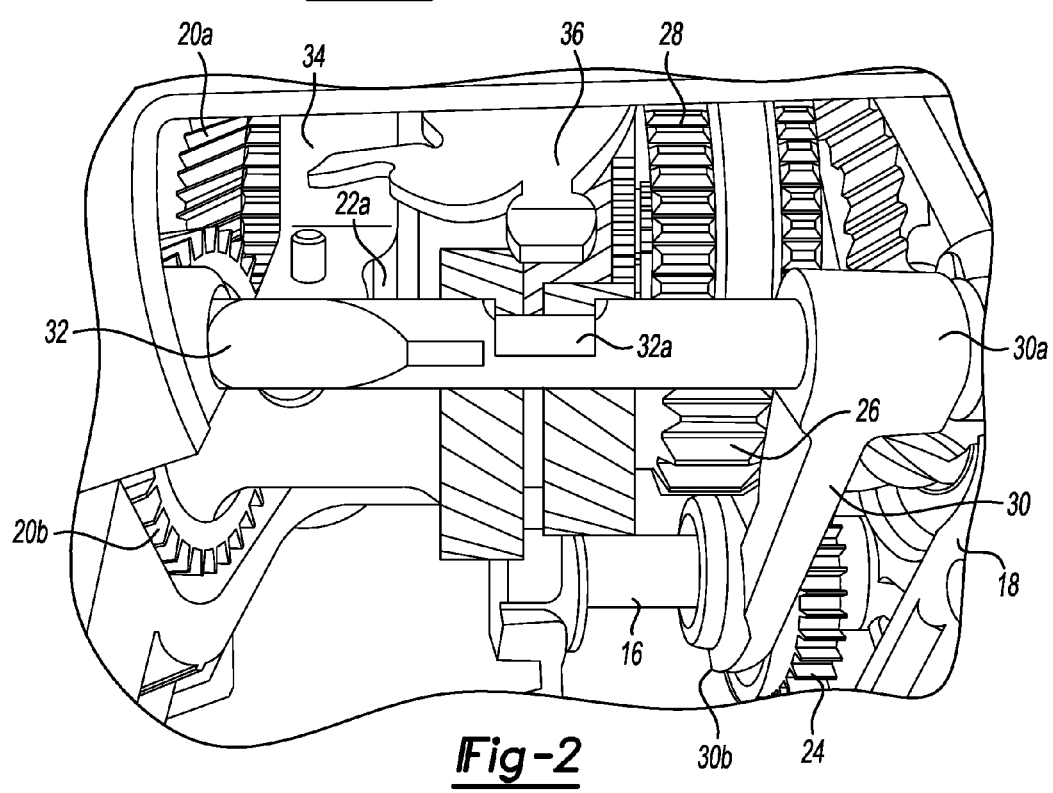
FIG. 2 is a partial plan view of the transmission according to the present disclosure.

Referring now to FIG. 2, a partial plan view of the transmission 10 of the present invention is shown. The transmission 10 further includes a plurality of shift forks 34, of which one example is shown, and a reverse gear engagement lever 36 configured to interact with the reverse shift rail 32 and the shift fork 34. The shift fork 34 is coupled for axial movement with the synchronizer 22.

Figure 3:
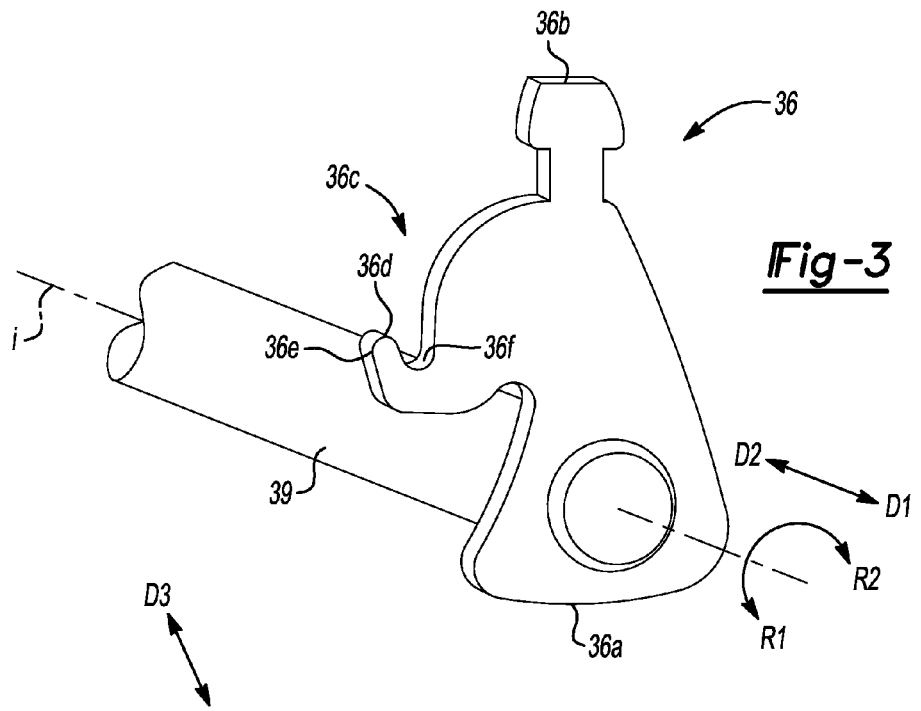
FIG. 3 is a perspective view of a reverse gear engagement lever or member according to the present disclosure.

Turning now to FIG. 3, the reverse gear engagement lever 36 is illustrated in detail. The reverse gear engagement lever 36 includes a first end portion 36A, a second end portion 36B and a cam portion 36C. The first end portion 36A is fixed to an elongated member or shaft 39 and is rotatable about an axis i in a first and second rotational directions R1, R2. The second end portion 36B is configured for engagement with a reverse notch 32A of the reverse shift rail 32 as shown in FIG. 2. The cam portion 36C has an outer surface 36E and an inner surface 36F. The reverse gear engagement lever 36 is also capable of movement in a first and second axial directions D1, D2.

Figure 4A:
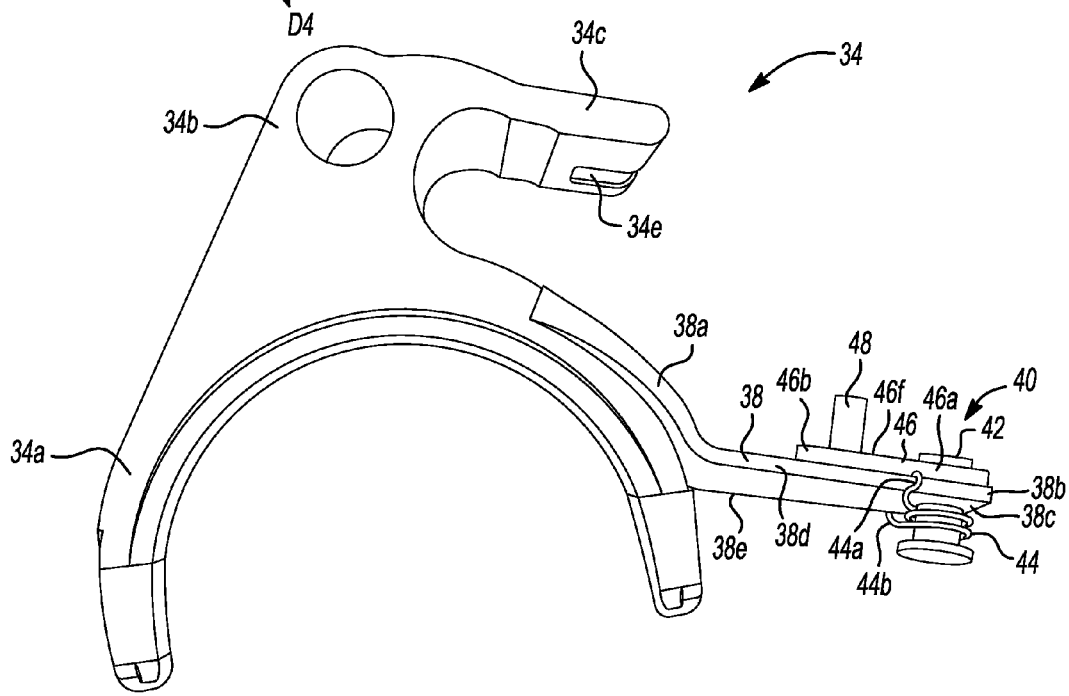
FIG. 4A is an axial view of a synchronizer shift fork member according to the present disclosure.

Turning now to FIG. 4A, the shift fork 34 is illustrated in detail. The shift fork 34 includes a synchronizer portion 34A, a shift rail portion 34B, an actuator portion 34C, and a pre-synchronizer portion 34D. The synchronizer portion 34A maintains a semi-annular shape having an inner diameter configured to engage an outer diameter of the synchronizer 22A shown in FIGS. 1 and 2. The shift rail portion 34B is rotatably supported on a shift rail 23, shown in FIG. 1, which is disposed parallel to the input and main shafts 12, 14. The actuator portion 34C includes a notch 34E that is configured to engage a gear shift linkage (not shown). The shift linkage provides input from the driver through a gear shift mechanism (not shown) via axial movement along the shift rail in directions D3, D4. The axial movement is transferred to the synchronizer 22A thus, depending on the axial direction D3, D4, engages one of two gears 20A, 20C with the main shaft 14.

Figure 4B:
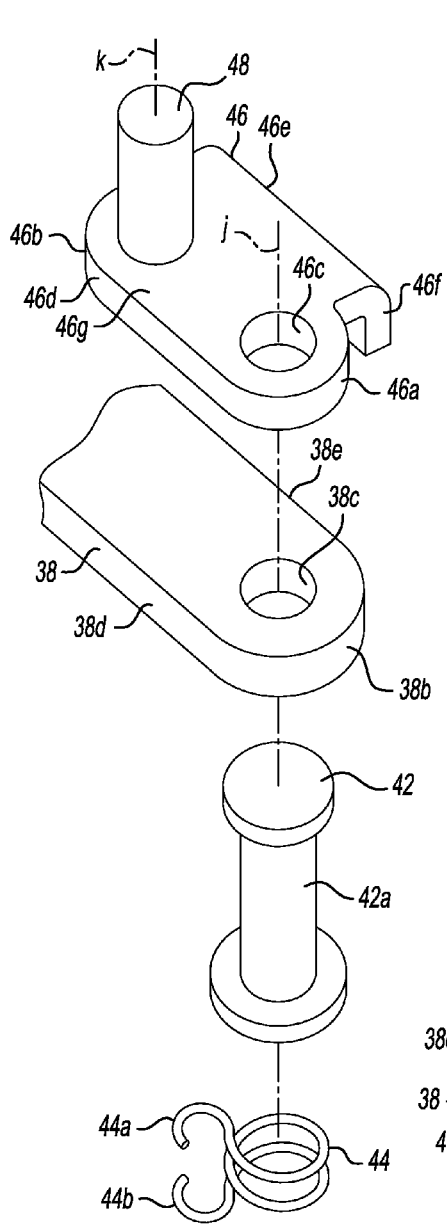
FIG. 4B is an exploded perspective view of a pre-synchronizer assembly according to the present disclosure.
Figure 4C:
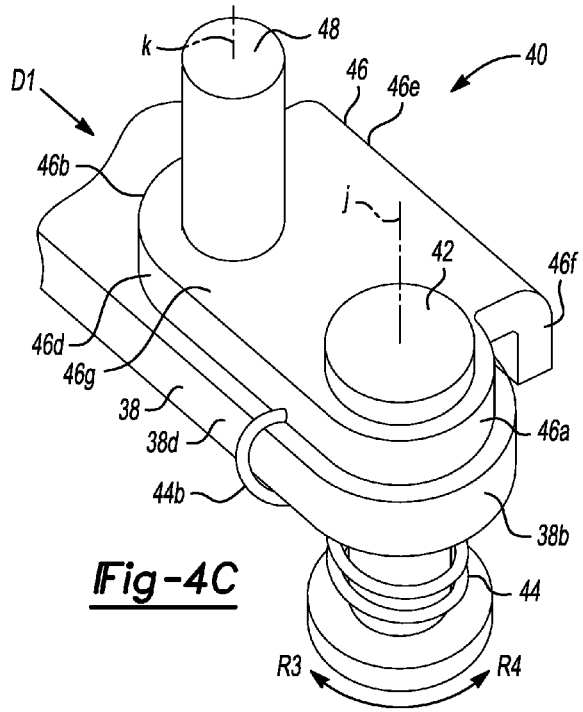
FIG. 4C is a perspective view of the pre-synchronizer assembly according to the present disclosure.
Figure 4D:
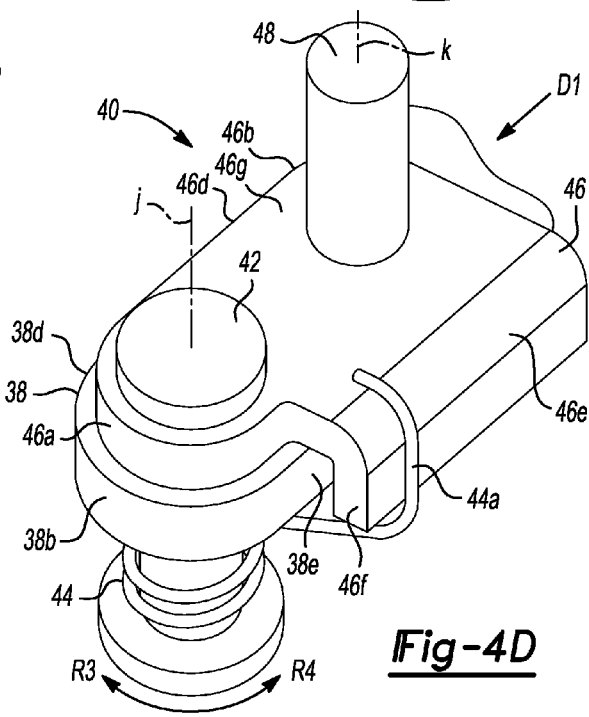
FIG. 4D is a perspective view of the pre-synchronizer assembly according to the present disclosure.

With continuing reference to FIG. 4A and additional reference to FIGS. 4B and 4C, the pre-synchronizer portion 34D of the shift fork 34 is illustrated in greater detail. The pre-synchronizer portion 34D of the shift fork 34 includes a flange 38 and a spring pivot assembly 40. The flange 38 has a first end portion 38A fixed to the synchronizer portion 34A of the shift fork 34 and a second end portion 38B including a pivot hole 38C. The spring pivot assembly 40 includes a pivot pin 42, a spring 44, a pivot member 46, and a pivot dowel 48. The pivot pin 42 is rotatably supported in the pivot hole 38C of the second end portion 38B of the flange 38. The pivot member 46 includes a first end portion 46A and a second end portion 46B opposite the first end portion 46A, a hole 46C disposed in the first end portion 46A, a first edge 46D, a second edge 46E, and an anti-rotation flange 46F extending perpendicularly from the second edge 46E of the pivot member 46. The hole 46C of the first end portion 46A is coaxial with the pivot hole 38C of the flange 38. The pivot pin 42 passes through both the pivot hole 38C of the flange 38 and the hole 46C of the pivot member 46. Thus the pivot member 46 is rotatably supported by the pivot pin 42 and rotates about the axis of the pivot pin 42 relative to the flange 38. The pivot member 46 extends adjacent to the flange 38 from the pivot pin 42 toward the synchronizer portion 34A of the shift fork 34. The spring 44 is a coil spring disposed on the outer axial surface 42A of the pivot pin 42 and includes a first end portion 44A and a second end portion 44B. However, other types of springs and configurations may be employed without departing from the scope of the invention. The end portions 44A, 44B of the spring 44 each form a hook capable of wrapping around opposite edges 38D, 38E of the flange 38. The first end portion 44B of the spring 44 contacts the first edge 46D of the pivot member 46 while the second end portion 44A of the spring 44 wraps around the anti-rotation flange 46F of the pivot member 46. The pivot member 46 is aligned with the flange 38 to establish a first or disengaged position P1. Rotating the pivot member 46 about the axis j of the pivot pin 42 establishes a second position P2. However, as the pivot member 46 rotates in a third rotational direction R3, the second end portion 44B of the spring 44 applies a centering force to the first edge 46D of the pivot member 46 thus providing a detent feel to the rotation of the pivot member 46. Alternatively, as the pivot member 46 rotates in a fourth rotational direction R4 the anti-rotation flange 46F of the pivot member 46 abuts the edge 38E of the flange 38, thus preventing rotation of the pivot member 46 in the fourth rotational direction R4. A pivot dowel 48 is fixed to the second end portion 46B of the pivot member 46. The axis k of the pivot dowel 48 extends perpendicularly from a top surface 46G of the pivot member 46.

Figure 7:
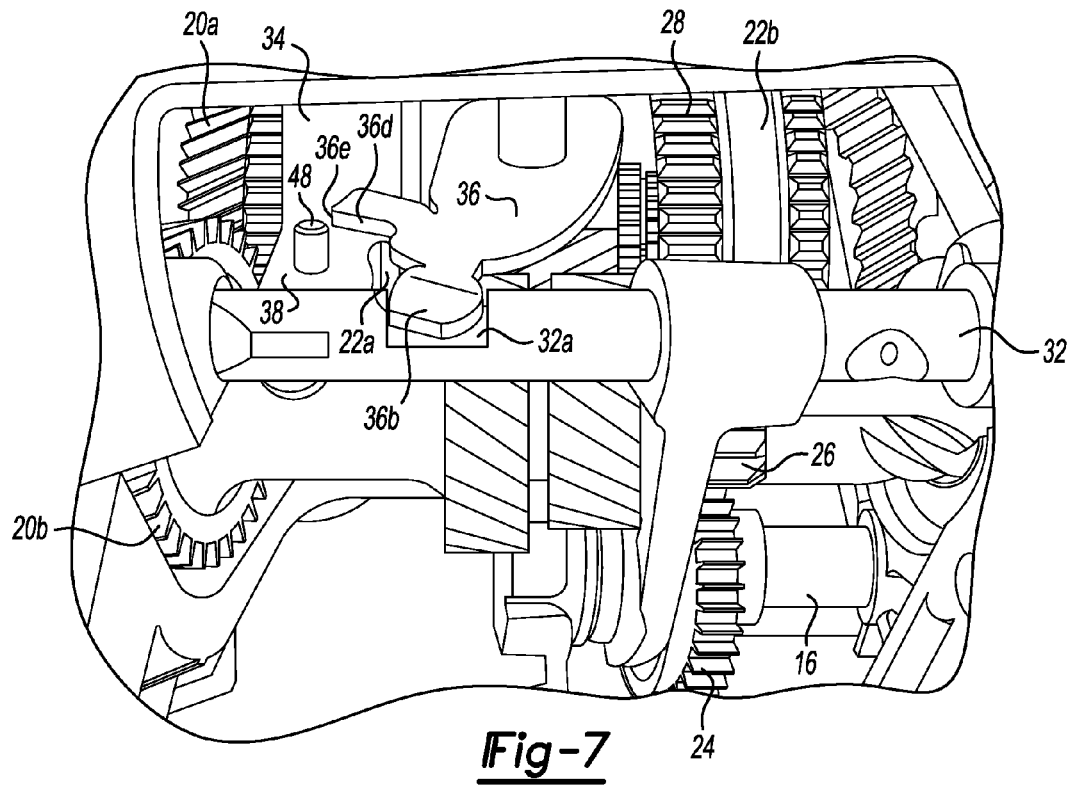
FIG. 7 is a partial plan view of the transmission according to the present disclosure.
Figure 8:
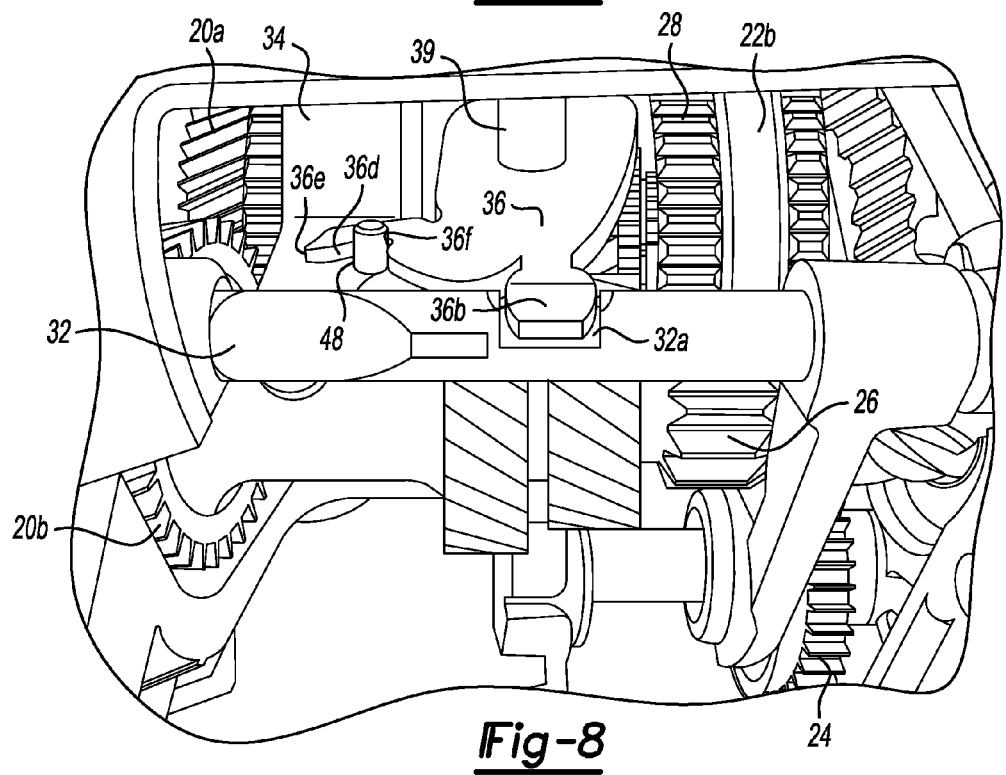
FIG. 8 is a partial plan view of the transmission according to the present disclosure.

Turning generally now to FIGS. 2 and 5-9, a schematic of the partial transmission 10 is illustrated in five positions including the first or disengaged position (FIG. 2), a second or reverse lever engagement position (FIG. 5), a third or partial engagement position (FIG. 6), a fourth or full engagement position (FIG. 7), and a fifth or released position (FIG. 8). In the first position, as shown in FIG. 2, the idler gear 24 does not contact or mesh with either of the reverse gear 26 of the input shaft 12 or the sleeve gear 28 of the main shaft 14. Additionally, the reverse gear engagement lever 36 is disengaged from the reverse notch 32A of the reverse shift rail 32.

Figure 5:
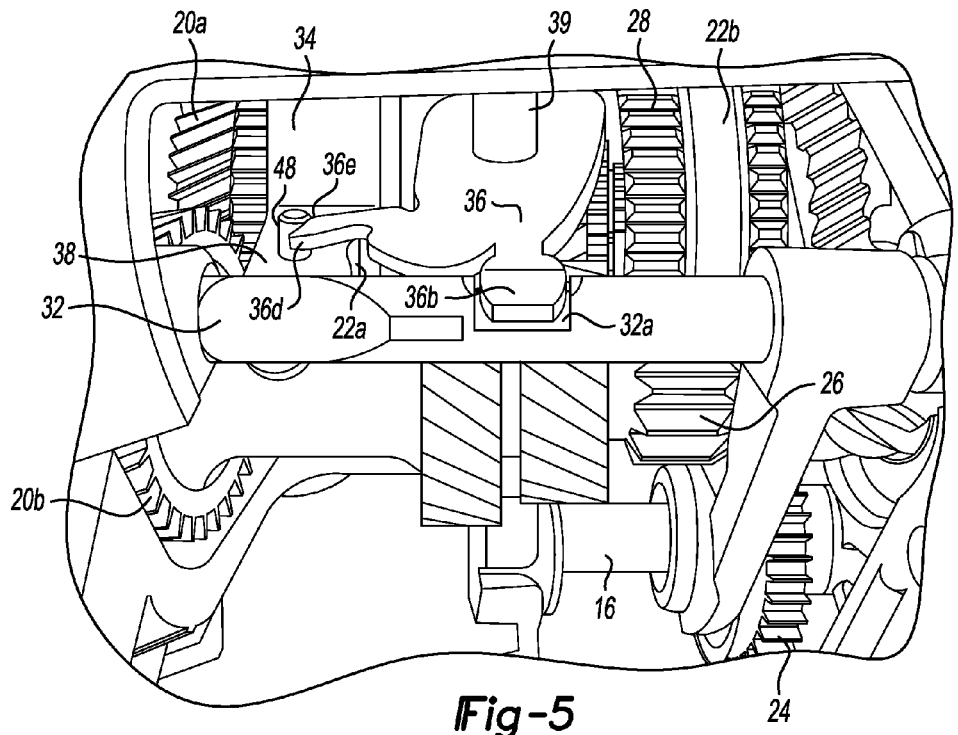
FIG. 5 is a partial plan view of the transmission according to the present disclosure.
Figure 6:
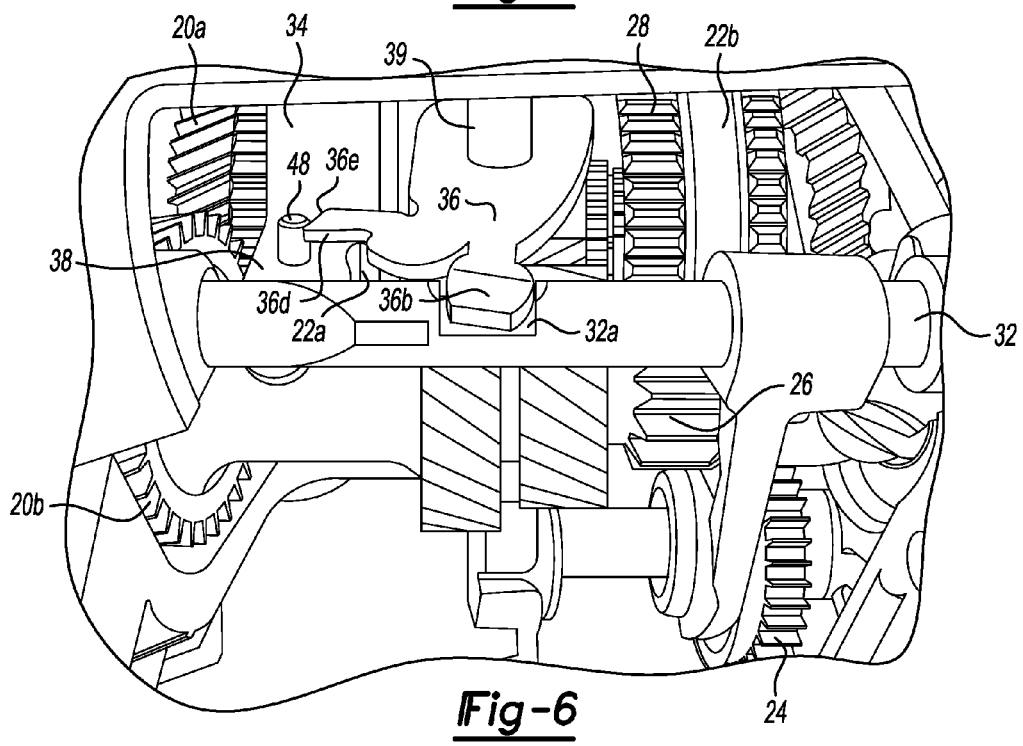
FIG. 6 is a partial plan view of the transmission according to the present disclosure.

In the second position, as shown in FIG. 5, the reverse gear engagement lever 36 is moved along the axis i in the D1 direction as shown in FIG. 3. The second end 36B of the reverse gear engagement lever 36 engages the reverse notch 32A of the reverse shift rail 32. However, the idler gear 24 still does not contact or mesh with either of the reverse gear 26 of the input shaft 12 or the sleeve gear 28 of the main shaft 14.

In the third position, the reverse gear engagement lever 36 rotates about the axis i in the first rotational direction R1 to a first rotational position, thus translating the reverse shift rail 32 and therefore the idler gear 24 axially along the idler shaft 16 to contact and mesh with the reverse gear 26 of the input shaft 12 but does not yet contact or mesh with the sleeve gear 28 of the main shaft 14. The outer surface 36E of the cam portion 36D of the reverse gear engagement lever 36 contacts and applies a force to the pivot dowel 48 which in turn applies a force to the spring 44 which has capacitive effect in applying a force to the shift fork 34 and the synchronizer 22A which triggers partial engagement of the corresponding gear 20A to the main shaft. Since the gear 20A meshes with a corresponding gear 20B rotatably fixed to the input shaft 12, the rotational speed of the input shaft 12 is reduced to the same rotational speed of the main shaft 14.

In the fourth position, as shown in FIG. 7, the reverse gear engagement lever 36 rotates further about the axis i in the first direction R1 to a second rotational position to achieve engagement of the reverse idler gear 24 and the sleeve gear 22 of the main shaft 14. While in the forth position, the synchronizer 22B adjacent the sleeve gear 28 engages the main shaft 14 and the sleeve gear 28 for common rotation. Also, the cam portion 36D of the reverse gear engagement lever 36 is no longer in contact with the pivot dowel 48 of the shift fork 34 thus releasing the synchronizer 22A which returns to a neutral position and disengages the gear 20A from the main shaft 14.

In the fifth position, as shown in FIG. 8, the reverse gear engagement lever 36 rotates in the opposite rotational direction R2 about the axis i to a third rotational position, moving the idler gear 24 axially so that it no longer meshes with the reverse gear 26 of the input shaft 12 and the sleeve gear 28 of the main shaft 14. The pivot dowel 48 is in contact with the inner surface 36F of the cam portion 36D of the reverse gear engagement lever 36. The spring 44 provides a compliant link between the reverse gear engagement lever 36 and the shift fork 34 thus preventing the shift fork 34 from engaging the synchronizer with either gear 20A, 20C of the main shaft 14. As the reverse gear engagement lever 36 returns to the first position, the pivot dowel 48 is released into the neutral position as shown in FIG. 2.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:
1. A multi-speed transmission comprising:
a first, a second, and a third shaft supported in parallel by a housing;
a first and a second gear set each having a drive gear radially aligned with a driven gear, wherein the drive gears are rotatably fixed to the first shaft, the driven gears are selectively rotatably connectable to the second shaft, and the drive gear of the first gear set meshes with the driven gear of the first gear set;
an idler gear rotatably supported by the third shaft, wherein the idler gear is selectively meshed with each of the drive gear and the driven gear of the second gear set;
a first and second shift rails supported by the housing and disposed parallel to the first, second, and third shafts;
a first and a second shift fork each having a first and second end portions, wherein the first end portion of the first shift fork is supported by the first shift rail, the first end portion of the second shift fork is fixed to the second shift rail, the second end portion of the second shift fork is coupled to the idler gear;
a synchronizer rotatably fixed to the first shaft and disposed adjacent the driven gear of the first gear set, wherein the synchronizer is coupled to the second portion of the first shift fork and is selectively engageable with the driven gear of the first gear set, and
a reverse lever having a first end portion, a second end portion, and a cam portion, wherein the first end portion is fixed to an elongated member having an axis, the reverse lever is rotatable about and movable along the axis of the elongated member, the second end portion is selectively engageable with the second shift rail, and the cam portion is selectively engageable with the second portion of the first shift fork; and wherein the reverse lever is selectively disposed in one of at least a first, second and third positions, wherein in the first position the reverse lever is fully retracted so that the second end portion is disengaged from the second shift rail, in the second position the reverse lever is axially extended so that the second end portion is fully engaged with the second shift rail, and in the third position the reverse lever is fully engaged with the second shift rail and rotated to a first rotational position so that the idler gear is at least partially meshed with the drive gear of the second gear set and the outer surface of the cam portion is in contact with the second portion of the first shift fork which partially engages the synchronizer with the driven gear of the first gear set.

2. The transmission of claim 1 wherein the reverse lever is selectively disposed in a fourth position, wherein in the fourth position the reverse lever is extended in the second direction and fully engaged with the second shift rail and rotated to a second rotational position so that the cam portion of the reverse lever is not in contact with the first shift fork, and the idler gear is fully meshed with each of the drive gear and the driven gear of the second gear set.

3. The transmission of claim 2 wherein the reverse lever is selectively disposed in a fifth position, wherein in the fifth position the reverse lever is extended in the second direction and fully engaged with the second shift rail and rotated to a third rotational position, and the inner surface of the cam portion is in contact with the first shift fork.

4. The transmission of claim 1 wherein the second end portion of the first shift fork includes a flange supporting a spring pivot assembly, wherein the flange includes a first portion and a second portion, the first portion of the flange is fixed to the first portion of the first shift fork, and the second portion of the flange has a first pivot hole.

5. The transmission of claim 4 wherein the spring pivot assembly includes:
a pivot member having a first end portion, a second end portion opposite the first end portion, a first edge, and a second edge opposite the first edge, wherein the pivot member is disposed adjacent to the flange of the first shift fork, the second end portion includes a second pivot hole aligned with the first pivot hole of the flange, and a anti-rotation flange is disposed on the second edge of the pivot member;
a pivot pin disposed in each of the first and second pivot holes;
a spring having a coil portion and two end portions, wherein the coil portion is disposed on the pivot pin, a first of the two end portion is disposed in contact with the first edge of the pivot member, and a second of the two end portions is disposed in contact with the second edge of the pivot member, and
a pivot dowel fixedly disposed on the second portion of the pivot member so that the axis of the pivot dowel is somewhat perpendicular to the pivot member; and
wherein the spring applies a detent force to the pivot member when the pivot member rotates in a first rotational direction about an axis of the pivot pin and the anti-rotation flange prevents rotation of the pivot member in a second rotational direction.

6. The transmission of claim 5 wherein when the reverse lever is in the third position the outer surface of the cam portion is in contact with the pivot dowel of the spring pivot assembly of the first shift fork which partially engages the synchronizer with the driven gear of the first gear set.

7. A multi-speed transmission comprising:
a first, a second, and a third shaft supported in parallel by a housing;
a first and a second gear set each having a drive gear radially aligned with a driven gear, wherein the drive gears are rotatably fixed to the first shaft, the driven gears are selectively rotatably connectable to the second shaft, and the drive gear of the first gear set meshes with the driven gear of the first gear set;
an idler gear rotatably supported by the third shaft, wherein the idler gear is selectively meshed with each of the drive gear and the driven gear of the second gear set;
a first and second shift rails supported by the housing and disposed parallel to the first, second, and third shafts;
a first and a second shift fork each having a first and second end portions, wherein the first end portion of the first shift fork is supported by the first shift rail, the first end portion of the second shift fork is fixed to the second shift rail, the second end portion of the first shift fork includes a flange supporting a spring pivot assembly, and the second end portion of the second shift fork is coupled to the idler gear;
a synchronizer rotatably fixed to the first shaft and disposed adjacent the driven gear of the first gear set, wherein the synchronizer is coupled to the second portion of the first shift fork and is selectively engageable with the driven gear of the first gear set, and
a reverse lever having a first end portion, a second end portion, and a cam portion, wherein the first end portion is fixed to an elongated member having an axis, the reverse lever is rotatable about and movable along the axis of the elongated member, the second end portion is selectively engageable with the second shift rail, and the cam portion is selectively engageable with the second portion of the first shift fork; and
wherein the reverse lever is selectively disposed in one of at least a first, second and third positions, wherein in the first position, the reverse lever is fully retracted so that the second end portion is disengaged from the second shift rail, in the second position, the reverse lever is axially extended so that the second end portion is fully engaged with the second shift rail, and in the third position, the reverse lever is fully engaged with the second shift rail and rotated to a first rotational position so that the idler gear is at least partially meshed with the drive gear of the second gear set and the outer surface of the cam portion is in contact with the second portion of the first shift fork which partially engages the synchronizer with the driven gear of the first gear set.

8. The transmission of claim 7 the reverse lever is selectively disposed in a fourth position, wherein in the fourth position the reverse lever is extended in the second direction and fully engaged with the second shift rail and rotated to a second rotational position so that the cam portion of the reverse lever is not in contact with the first shift fork, and the idler gear is fully meshed with each of the drive gear and the driven gear of the second gear set.

9. The transmission of claim 8 wherein the reverse lever is selectively disposed in a fifth position, wherein in the fifth position the reverse lever is extended in the second direction and fully engaged with the second shift rail and rotated to a third rotational position, and the inner surface of the cam portion is in contact with the first shift fork.

10. The transmission of claim 7 wherein the flange of the first shift fork includes a first portion and a second portion, the first portion of the flange is fixed to the first portion of the first shift fork, and the second portion of the flange has a first pivot hole.

11. The transmission of claim 10 wherein the spring pivot assembly includes:
- a pivot member having a first end portion, a second end portion opposite the first end portion, a first edge, and a second edge opposite the first edge, wherein the pivot member is disposed adjacent to the pivot member of the first shift fork, the second end portion includes a second pivot hole aligned with the first pivot hole of the flange;
- a pivot pin disposed in each of the first and second pivot holes;
- a spring having a coil portion and two end portions, wherein the coil portion is disposed on the pivot pin, a first of the two end portion is disposed in contact with the first edge of the pivot member, and a second of the two end portions is disposed in contact with the second edge of the pivot member, and
- a pivot dowel fixedly disposed on the second portion of the pivot member so that the axis of the pivot dowel is somewhat perpendicular to the pivot member; and
- wherein the spring applies a detent force to the pivot member when the pivot member rotates in either rotational direction about an axis of the pivot pin.

12. The transmission of claim 11 wherein when the reverse lever is in the third position the outer surface of the cam portion is in contact with the pivot dowel of the spring pivot assembly of the first shift fork which partially engages the synchronizer with the driven gear of the first gear set.

13. A multi-speed transmission comprising:
- a first, a second, and a third shaft supported in parallel by a housing;
- a first and a second gear set each having a drive gear radially aligned with a driven gear, wherein the drive gears are rotatably fixed to the first shaft, the driven gears are selectively rotatably connectable to the second shaft, and the drive gear of the first gear set meshes with the driven gear of the first gear set;
- an idler gear rotatably supported by the third shaft, wherein the idler gear is selectively meshed with each of the drive gear and the driven gear of the second gear set;
- a first and second shift rails supported by the housing and disposed parallel to the first, second, and third shafts;
- a first and a second shift fork each having a first and second end portions, wherein the first end portion of the first shift fork is supported by the first shift rail, the first end portion of the second shift fork is fixed to the second shift rail, the second end portion of the first shift fork includes a flange supporting a spring pivot assembly, and the second end portion of the second shift fork is coupled to the idler gear;
- a synchronizer rotatably fixed to the first shaft and disposed adjacent the driven gear of the first gear set, wherein the synchronizer is coupled to the second portion of the first shift fork and is selectively engageable with the driven gear of the first gear set, and
- a reverse lever having a first end portion, a second end portion, and a cam portion, wherein the first end portion is fixed to an elongated member having an axis, the reverse lever is rotatable about and movable along the axis of the elongated member, the second end portion is selectively engageable with the second shift rail, and the cam portion is selectively engageable with the second portion of the first shift fork; and
- wherein the reverse lever is selectively disposed in one of at least a first, second and third positions, wherein in the first position the reverse lever is fully retracted so that the second end portion is disengaged from the second shift rail, in the second position the reverse lever is axially extended so that the second end portion is fully engaged with the second shift rail, and in the third position the reverse lever is fully engaged with the second shift rail and rotated to a first rotational position so that the idler gear is at least partially meshed with the drive gear of the second gear set and the outer surface of the cam portion is in contact with the second portion of the first shift fork which partially engages the synchronizer with the driven gear of the first gear set, in the fourth position the reverse lever is extended in the second direction and fully engaged with the second shift rail and rotated to a second rotational position so that the cam portion of the reverse lever is not in contact with the first shift fork, and the idler gear is fully meshed with each of the drive gear and the driven gear of the second gear set, and in the fifth position in the fifth position the reverse lever is extended in the second direction and fully engaged with the second shift rail and rotated to a third rotational position, and the inner surface of the cam portion is in contact with the first shift fork.

14. The transmission of claim 13 wherein the flange of the first shift fork includes a first portion and a second portion, the first portion of the flange is fixed to the first portion of the first shift fork, and the second portion of the flange has a first pivot hole.

15. The transmission of claim 14 wherein the spring pivot assembly includes:
- a pivot member having a first end portion, a second end portion opposite the first end portion, a first edge, and a second edge opposite the first edge, wherein the pivot member is disposed adjacent to the pivot member of the first shift fork, the second end portion includes a second pivot hole aligned with the first pivot hole of the flange;
- a pivot pin disposed in each of the first and second pivot holes;
- a spring having a coil portion and two end portions, wherein the coil portion is disposed on the pivot pin, a first of the two end portion is disposed in contact with the first edge of the pivot member, and a second of the two end portions is disposed in contact with the second edge of the pivot member, and
- a pivot dowel fixedly disposed on the second portion of the pivot member so that the axis of the pivot dowel is somewhat perpendicular to the pivot member; and
- wherein the spring applies a detent force to the pivot member when the pivot member rotates in either rotational direction about an axis of the pivot pin.

16. The transmission of claim 15 wherein when the reverse lever is in the third position the outer surface of the cam portion is in contact with the pivot dowel of the spring pivot assembly of the first shift fork which partially engages the synchronizer with the driven gear of the first gear set.

* * * * *